United States Patent [19]

Gephardt et al.

[11] Patent Number: 5,557,757
[45] Date of Patent: Sep. 17, 1996

[54] HIGH PERFORMANCE INTEGRATED PROCESSOR ARCHITECTURE INCLUDING A SUB-BUS CONTROL UNIT FOR GENERATING SIGNALS TO CONTROL A SECONDARY, NON-MULTIPLEXED EXTERNAL BUS

[75] Inventors: Douglas D. Gephardt; Dan S. Mudgett, both of Austin; James R. MacDonald, Buda, all of Tex.

[73] Assignee: Advanced Micro Devices, Sunnyvale, Calif.

[21] Appl. No.: 190,647

[22] Filed: Feb. 2, 1994

[51] Int. Cl.⁶ .................................................. G06F 13/38
[52] U.S. Cl. ............................................ 395/306; 395/310
[58] Field of Search ..................................... 395/309, 310, 395/308, 325, 275, 306

[56] References Cited

U.S. PATENT DOCUMENTS

| | | | |
|---|---|---|---|
| 4,979,097 | 12/1990 | Triolo et al. | 395/250 |
| 5,191,657 | 3/1993 | Ludwig et al. | 395/306 |
| 5,255,374 | 10/1993 | Aldereguia et al. | 395/325 |
| 5,261,057 | 11/1993 | Coyle et al. | 395/275 |
| 5,309,568 | 5/1994 | Ghosh et al. | 395/325 |
| 5,396,602 | 3/1995 | Amini et al. | 395/325 |

Primary Examiner—Jack B. Harvey
Assistant Examiner—Glenn A. Auve
Attorney, Agent, or Firm—B. Noel Kivlin

[57] ABSTRACT

An integrated processor that employs a bus interface unit to accommodate high performance data transfers via an external peripheral interconnect bus with multiplexed address/data lines. The peripheral interconnect bus, which may be a PCI standard bus, accommodates data transfers between an internal bus of the integrated processor and PCI peripheral devices. The integrated processor further includes a sub-bus control unit that generates a set of side-band control signals that allow the external derivation of a lower performance secondary bus, such as an ISA bus, without requiring a complete set of external pins for the secondary bus on the integrated processor. The derivation of the secondary bus is accomplished with an external data buffer and an external address latch which are controlled by the side-band control signals. Separate address and data lines from the integrated processor for the secondary bus are not required. Accordingly, high performance peripheral devices are supported by the integrated processor as well as lower performance, lower-cost peripherals without a significant increase in the pin-count of the integrated processor. Accordingly, overall cost of the integrated processor is kept low while a wide range of peripheral devices are supported.

17 Claims, 8 Drawing Sheets

HIGH PERFORMANCE INTEGRATED PROCESSOR ARCHITECTURE INCLUDING A SUB-BUS CONTROL UNIT FOR GENERATING SIGNALS TO CONTROL A SECONDARY, NON-MULTIPLEXED EXTERNAL BUS

BACKGROUND OF THE INVENTION

1. Field of the Invention

This invention relates to integrated processing systems and more particularly to a high performance integrated processor architecture that supports an external derivation of a low performance peripheral bus from a multiplexed peripheral bus.

2. Description of the Relevant Art

FIG. 1 is a block diagram of a computer system 10 including a microprocessor (CPU) 12, a CPU local bus 14 coupled to microprocessor 12, and a memory controller 16 and a local bus peripheral device 18 coupled to CPU local bus 14. A system memory 18 is further shown coupled to memory controller 16. A PCI standard bus 20 is coupled to CPU local bus 14 through a PCI bus bridge 22, and an ISA (Industry Standard Architecture) bus 24 is coupled to CPU local bus 14 through ISA bus bridge 26. A PCI peripheral device 28 is finally shown coupled to PCI bus 20, and an ISA peripheral device 30 is shown coupled to ISA bus 24.

Microprocessor 12 is illustrative of, for example, a model 80486 microprocessor, and CPU local bus 14 is exemplary of an 80486-style local bus. The CPU local bus 14 includes a set of data lines D[31:0], a set of address lines A[31:0], and a set of control lines (not shown individually). Details regarding the various bus cycles and protocols of the 80486 CPU local bus 14 are described in a host of publications of the known prior art.

PCI bus bridge 22 provides a standard interface between the CPU local bus 14 and the PCI bus 20. As such, PCI bus bridge 22 orchestrates the transfer of data, address, and control signals between the two buses. PCI bus 20 is high performance peripheral bus that supports burst-mode data transfers and that includes multiplexed data/address lines. PCI peripheral device 28 is illustrative of, for example, any PCI compatible peripheral device such as a disk controller.

The ISA bus 24 of FIG. 1 supports the connection of ISA peripheral devices within computer system 10. ISA bus 26 orchestrates the transfer of data, address, and control signals between CPU local bus 14 and ISA bus 24. Although ISA bus 24 is a relatively low performance bus, the inclusion of ISA bus 24 and ISA bus bridge 26 within computer system 10 advantageously allows ISA peripheral devices to be connected within the system. It is noted that this feature is advantageous since a wide variety of ISA compatible peripheral devices are currently available.

Microprocessor 12, memory controller 16, PCI bus bridge 22, and ISA bus bridge 26 have traditionally been fabricated on separate integrated circuit chips. A new trend in computing systems has developed, however, that involves the incorporation of a CPU core along with a variety of peripherals on a single integrated processor chip. An exemplary integrated processor chip includes a bus bridge that provides a high performance interface between an internal CPU local bus and, for example, an external PCI bus. By providing a high performance interface to an external PCI bus, relatively high performance characteristics can be achieved with respect to external data transfers. However, since an ISA bus interface is typically not incorporated on such an integrated processor chip, ISA compatible peripheral devices are not supported by the system. Although the ISA peripheral devices are typically relatively low performance devices, a wide variety of ISA peripherals are available, and the cost of such peripherals is relatively low. Thus, for certain applications, an integrated processor incorporating only a PCI bus bridge is unsuitable. Although it is evident that an ISA bus bridge could be incorporated on the integrated processor to provide an interface to an external ISA bus, an additional set of dedicated package pins would be required for the ISA bus. This would result in a high overall cost of the integrated processor since a relatively large number of external pins would be required on the integrated circuit package and since the required die size of the integrated processor would be relatively large due to the additional bond wire pads.

SUMMARY OF THE INVENTION

The problems outlined above are in large part solved by an integrated processor that employs a high performance integrated processor architecture according to the present invention. In one embodiment, an integrated processor includes a bus interface unit that provides an interface to a high performance peripheral interconnect bus with multiplexed address/data lines. The peripheral interconnect bus, which may be a PCI standard bus, accommodates data transfers between an internal bus of the integrated processor and PCI peripheral devices. The integrated processor further includes a sub-bus control unit that generates a set of side-band control signals that allow the external derivation of a lower performance secondary bus, such as an ISA bus, without requiring a complete set of external pins for the secondary bus on the integrated processor. The derivation of the secondary bus is accomplished with an external data buffer and an external address latch which are controlled by the side-band control signals. Separate address and data lines from the integrated processor for the secondary bus are not required. Accordingly, high performance peripheral devices are supported by the integrated processor as well as lower performance, lower-cost peripherals without a significant increase in the pin-count of the integrated processor. Accordingly, overall cost of the integrated processor is kept low while a wide range of peripheral devices are accommodated.

Broadly speaking, the present invention contemplates a computer system comprising a peripheral bus including a plurality of multiplexed address/data lines, a latch having an input port coupled to a plurality of multiplexed address/data lines, a data buffer having a first port coupled to said plurality of multiplexed address/data lines and an integrated processor. The integrated processor includes a CPU core, a local bus coupled to the CPU core, and a bus interface unit capable of interfacing data, address, and control signals between the local bus and the peripheral bus. The integrated processor further includes a sub-bus bus control unit coupled to the local bus and capable of generating a loading signal indicative of the presence of a valid address on the peripheral bus. A peripheral device is also included having a plurality of addressing lines coupled to an output port of the latch, and a plurality of data lines coupled to a second port of the data buffer.

The present invention further contemplates a method for driving an ISA-style sub-bus externally from an integrated processor, wherein the integrated processor includes a CPU core, a local bus coupled to the CPU core, and a bus interface unit for interfacing data, address, and control signals between the local bus and an external multiplexed peripheral bus. The method comprises the steps of driving a plurality of multiplexed address/data lines of the peripheral bus with a valid address signal, asserting a loading signal when the peripheral bus is driven with the valid address signal, and latching the valid address signal in response to the loading signal. The method further comprises the steps of providing the valid address signal to a peripheral device, providing an I/O transfer request signal to the peripheral device, and providing valid data through said data buffer.

The present invention finally contemplates a computer system comprising a PCI standard configuration peripheral bus including a plurality of multiplexed address/data lines, a latch having an input port coupled to the plurality of multiplexed address/data lines, and a data buffer having a first port coupled to the plurality of multiplexed address/data lines. An integrated processor is also provided including a CPU core, a local bus coupled to the CPU core, and a bus interface unit capable of interfacing data, address, and control signals between the local bus and the PCI standard configuration peripheral bus. The integrated processor also includes an ISA sub-bus control unit coupled to the local bus and capable of generating a loading signal indicative of the presence of a valid address on the PCI standard configuration peripheral bus. A peripheral device is finally provided having a plurality of addressing lines coupled to an output port of the latch, and a plurality of data lines coupled to a second port of the data buffer.

BRIEF DESCRIPTION OF THE DRAWINGS

Other objects and advantages of the invention will become apparent upon reading the following detailed description and upon reference to the accompanying drawings in which.

Figure 1:
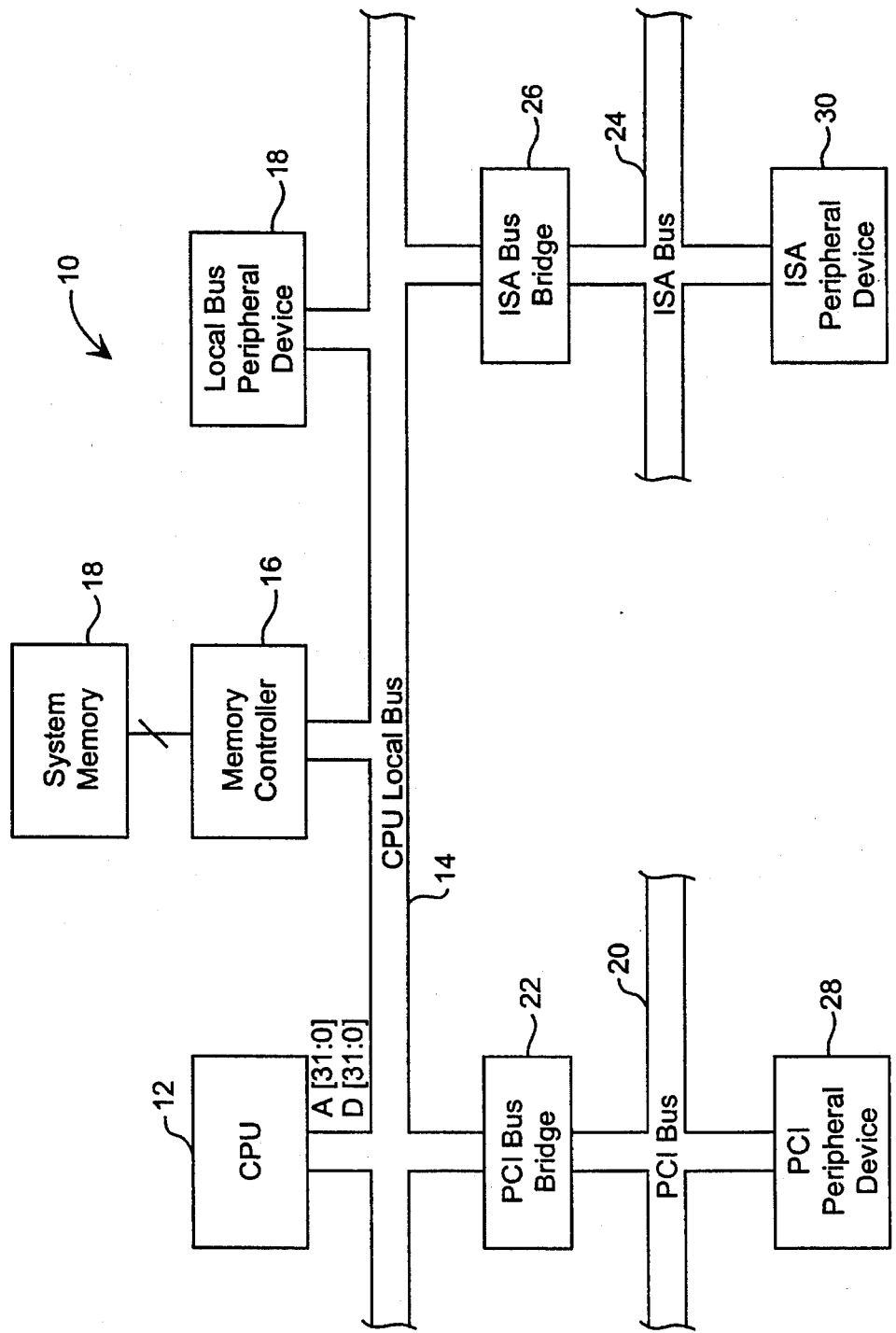
FIG. 1 is a block diagram of a computer system including a high performance PCI peripheral bus and a lower performance ISA peripheral bus.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 2:
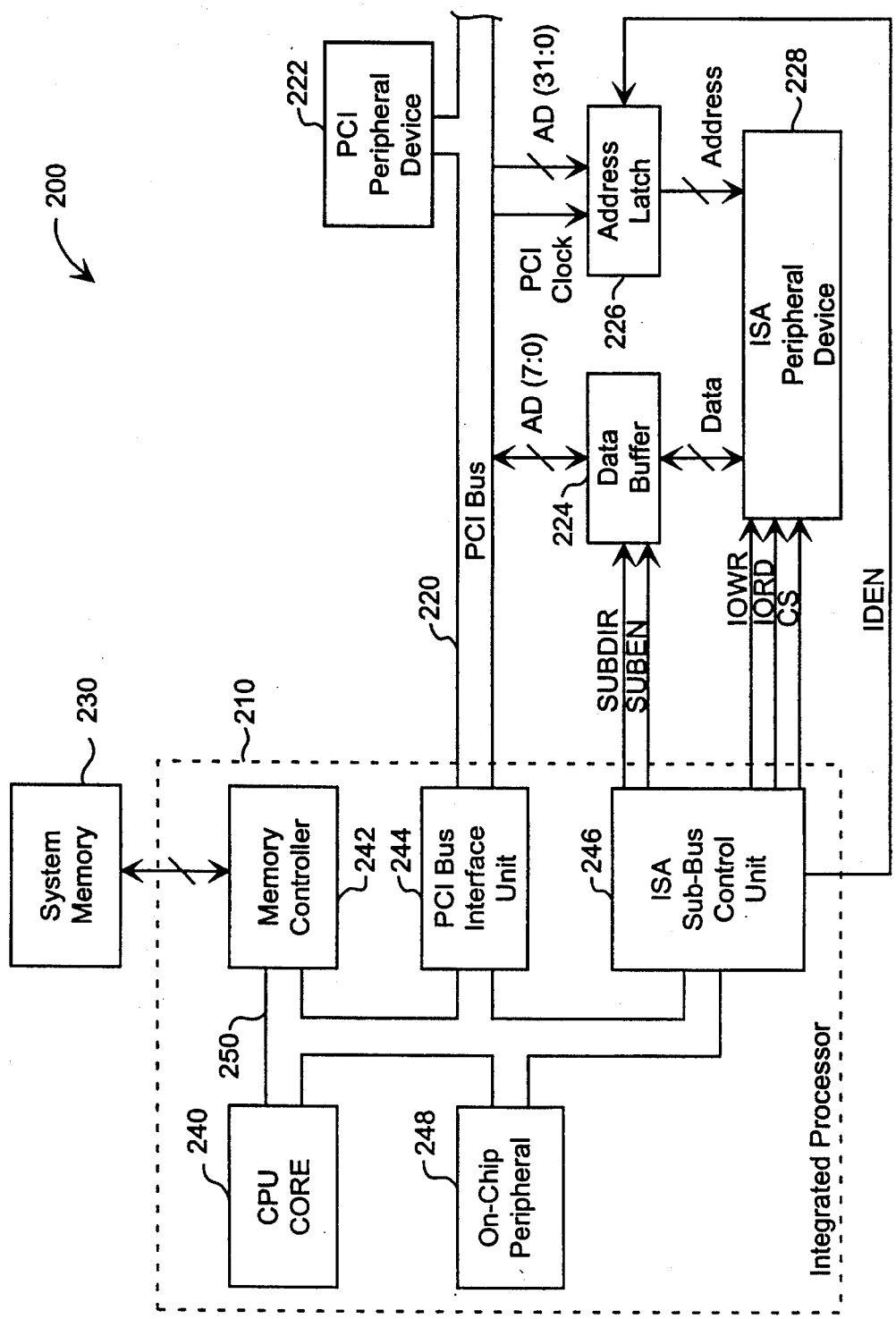
FIG. 2 is a block diagram of a computer system including an integrated processor architecture in accordance with the present invention.

Referring now to FIG. 2, a block diagram is shown of a computer system 200 including an integrated processor 210 according to the present invention. In addition to integrated processor 210, computer system 200 further includes a PCI bus 220 coupled to a PCI peripheral device 222, a data buffer 224, and an address latch 226. Computer system 200 finally includes an ISA peripheral device 228 and a system memory 230 coupled to integrated processor 210.

Integrated processor 210 includes a CPU core 240 coupled to a memory controller 242, a PCI bus interface unit 244, an ISA sub-bus control unit 246, and an on-chip peripheral device 248 via an internal bus 250. Each of the illustrated components of integrated processor 210 are fabricated on a single integrated circuit and are housed within a common integrated circuit package. In the embodiment shown, CPU core 240 implements a model 80486 microprocessor instruction set. Bus 250 is a model 80486-style local bus. It is understood, however, that CPU core 240 could be configured to implement other microprocessortype instruction sets.

PCI bus interface unit 244 provides an interface between the CPU local bus 250 and PCI bus 220. As such, PCI bus interface unit 244 orchestrates the transfer of data, address, and control signals between CPU local bus 250 and PCI bus 220. Details regarding PCI bus 220 are described within the publication entitled "PCI Local Bus Specification"; PCI Special Interest Group; Hillsboro, Oregon; 1993. This publication is incorporated herein by reference in its entirety.

On-chip peripheral 248 is illustrative of any one of a variety of peripheral devices that may be incorporated within integrated processor 210. For example, peripherals such as a direct memory access controller, an interrupt controller, and a timer could be included as an integral portion of integrated processor 210.

Memory controller 242 controls the transfer of data between CPU local bus 250 and system memory 230. Since memory controller 242 and CPU core 240 are fabricated on a common integrated circuit, the performance of each is scaled similarly with variations in processor technology.

As will be explained in further detail below, ISA sub-bus control unit 246 generates a set of signals labeled SUBDIR, SUBEN, and LDEN, along with an I/O read signal IORD, an I/O write signal IOWR, and a chip select signal CS. These signals are referred to collectively as ISA side-band signals. The ISA side-band signals allow data transfers to or from an external ISA peripheral device by controlling the transfer of data and address signals between PCI bus 220, data buffer 224, and address latch 226. The ISA sub-bus control unit 246 is synchronized with the PCI bus interface unit 244 to ensure proper timing of the side-band signals SUBDIR, SUBEN, LDEN, IOWR, IORD, and CS.

Data buffer 224 is a multi-bit, bidirectional buffer which channels data signals between PCI bus 220 and ISA peripheral device 228. Data buffer 224 is enabled by the side-band signal SUBEN, and the directionality of data buffer 224 is controlled by the side-band signal SUBDIR. It is noted that for situations in which ISA peripheral device 228 is an 8-bit peripheral, data buffer 224 is an 8-bit buffer and may be coupled to the lower 8-bits (AD[7:0]) of the multiplexed address/data lines of PCI bus 220. For situations in which ISA peripheral device 228 is a 16-bit peripheral, data buffer 224 is a 16-bit buffer and may be coupled to the PCI bus lines AD[15:0].

Address latch 226 is a multi-bit latching circuit which provides address signals from PCI bus 222 to ISA peripheral device 228. For the embodiment of FIG. 2, address latch 226 may be up to 32-bit latch; however, it is noted that address latch 226 need only support the number of addressing lines required by the ISA peripheral device. Address latch 226 is enabled by the loading signal LDEN and is clocked by the PCI clock signal PCICLK. Address latch 226 may be implemented with a set of type '377 D latches.

Details regarding the data, address, and control signals associated with integrated processor 210, PCI bus 220, data buffer 224, address latch 226, and ISA peripheral device 228 are next considered. The multiplexed address/data (A/D) lines of PCI bus 220 are connected to an input port of address latch 226. The clock signal PCICLK is connected to a clock input of address latch 226, and the load enable signal LDEN generated by ISA sub-bus control unit 246 is coupled to the enable input of address latch 226. An output port of address latch 226 is coupled to an address port of ISA peripheral device 228.

The multiplexed address/data (A/D) lines of PCI bus 220 are additionally coupled to data buffer 224. In the embodiment shown, ISA peripheral device 228 is an 8-bit device, and thus the low order 8-bits of the multiplexed address/data lines (AD[7:0]) of PCI bus 228 are coupled to data buffer 224. A second port of data buffer 224 is coupled to a data port of ISA peripheral device 228. The data enable signal SUBEN and the data direction signal SUBDIR generated by ISA sub-bus control unit 246 are respectively coupled to an enable input and a direction input of data buffer 224. As stated previously, these signals control the enabling and directionality of data buffer 224. The chip select signal generated by ISA sub-bus control unit 246 is coupled to the chip select input of ISA peripheral device 228, and the I/O read signal IORD and the I/O write signal IOWR are further coupled to ISA peripheral device 228 for controlling the reading and writing of data into and out of ISA peripheral device 228.

Figure 3:
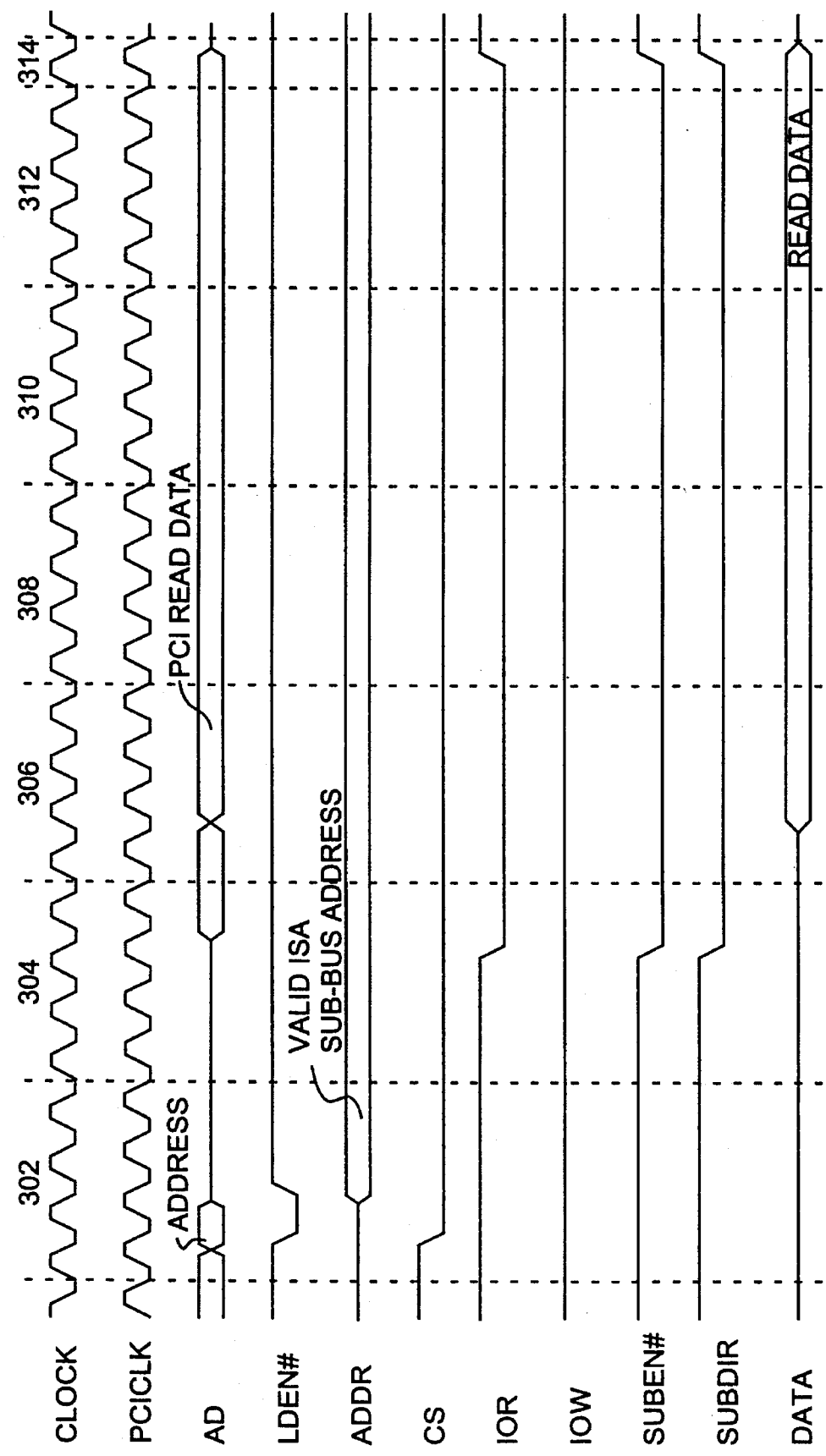
FIG. 3 is a timing diagram that illustrates the generation of address, data, and control signals for a read operation to an ISA peripheral device connected to the integrated processor of FIG. 2.

Referring next to FIG. 3 in conjunction with FIG. 2, the operation of computer system 200 is next explained. FIG. 3 is a timing diagram that illustrates the data, address, and control signals associated with an I/O read operation to ISA peripheral device 228. When CPU core 240 initiates a read cycle to the I/O addressable space to which ISA peripheral device 228 is mapped, a valid address signal is driven through the PCI bus interface unit 244 and on to the multiplexed address/data lines AD[31:0] of PCI bus 220 during an ISA sub-bus state 302. At this time, the ISA sub-bus control unit 246 asserts the loading signal LDEN. The valid address signal is thereby latched into address latch 226 synchronously with the rising edge of the PCI clock signal. At the same time the valid address signal is driven on PCI bus 220, the chip select signal CS is asserted low by ISA sub-bus control unit 246 to select peripheral device 228. As illustrated in FIG. 3, the chip select signal CS is asserted low throughout the I/O read cycle to ISA peripheral device 228. Upon the rising edge of the loading signal LDEN, a valid address signal is provided at the output of address latch 226 and to the address port of ISA peripheral device 228.

During the next ISA sub-bus state 304, the I/O read signal IOR as well as the enable signal SUBEN and the data direction signal SUBDIR are asserted low. The ISA peripheral device 228 responsively fetches the data from the requested location, and drives the data through data buffer 224 to the multiplexed address/data lines of PCI bus 220. As illustrated in the figure, the data is driven on the PCI bus 220 during states 306, 308, 310, and 312. When the ISA sub-bus control unit 246 deasserts the I/O read signal IOR during state 314, PCI interface unit 244 latches the data into the integrated processor 210. This completes the ISA sub-bus read operation.

A write operation to ISA peripheral device 228 is similar. It is noted that standard ISA-style bus timing is employed for write cycles to ISA peripheral device 228. It is also noted that during a write cycle, the directional signal SUBDIR is complemented to allow opposite flow of data from PCI bus 220 to ISA peripheral device 228.

Figure 4:
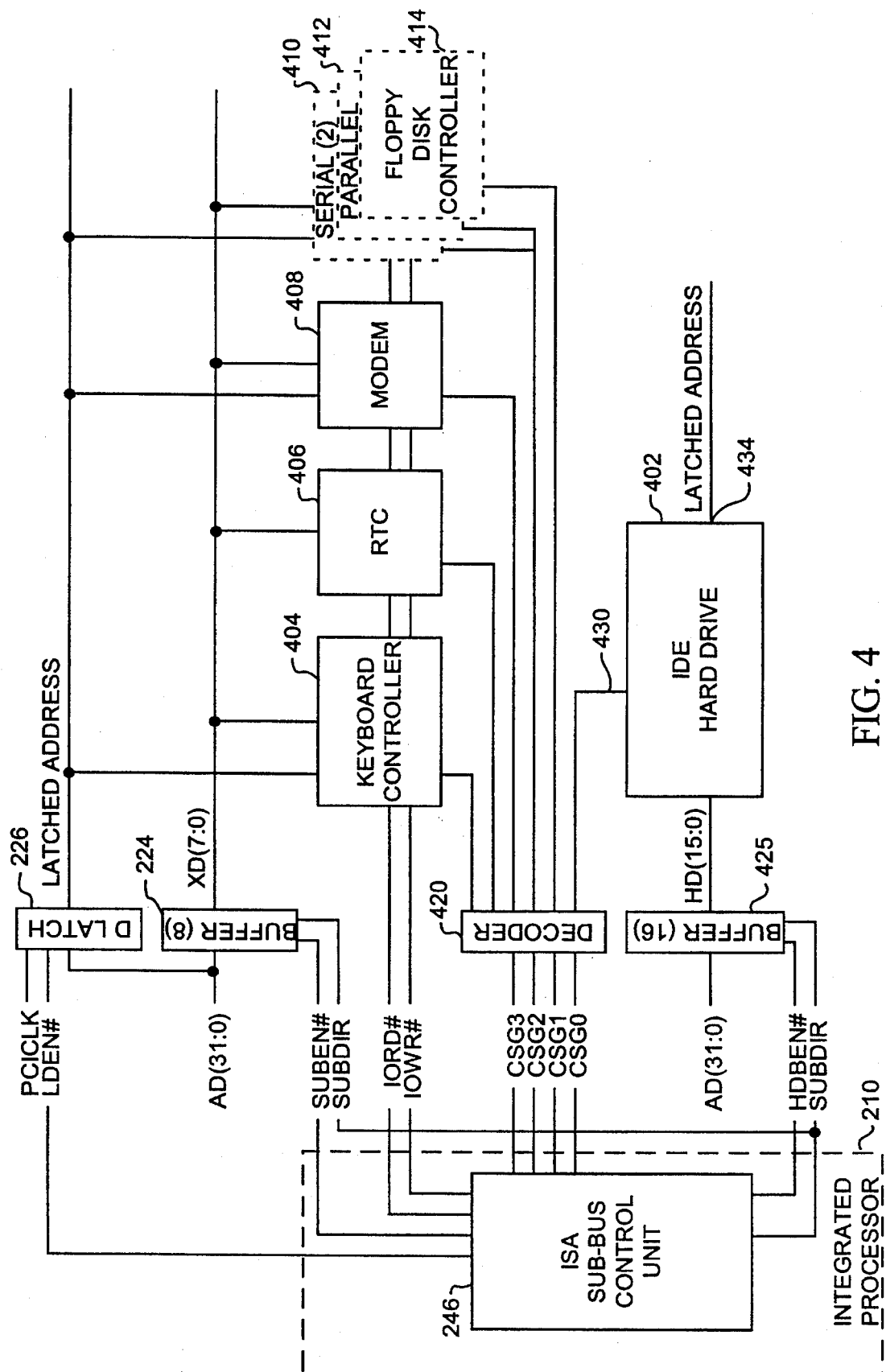
FIG. 4 is a block diagram that illustrates the connection of several standard 8-bit ISA peripherals and a 16-bit IDE hard drive to the integrated processor of FIG. 2.

Referring next to FIG. 4, a block diagram is shown of another configuration of an integrated processor 210 that employs a high performance integrated processor architecture according to the present invention. It is noted that circuit portions that correspond to those of FIG. 2 are numbered identically. It is further noted that various subunits of integrated processor 210 as illustrated in FIG. 2 (i.e., such as CPU core 240 and PCI bux interface unit 244) have been omitted from the drawing of FIG. 4 for simplicity and clarity.

The configuration of FIG. 4 is similar to that of FIG. 2; however, the ISA sub-bus control unit 246 of FIG. 4 is capable of controlling a plurality of standard ISA peripherals in addition to an IDE (Integrated Drive Electronics) hard drive 402. The standard ISA peripherals illustrated in FIG. 4 include a keyboard controller 404, a real time clock (RTC) 406, a modem 408, a serial port 410, a parallel port 412, and a floppy controller 414. As will be explained in greater detail below, the ISA sub-bus control unit 246 generates a set of chip select signal (CSG0–CSG3) to select a particular ISA device. The chip signals CSG0–CSG3 are driven by the ISA sub-bus control unit 246 with an encoded signal which is decoded by a decoder 420 to enable an addressed ISA peripheral bus.

In addition to the data enable signal SUBEN and the data direction SUBDIR, which are generated in a manner similar to that described above in connection with FIG. 2, the ISA sub-bus control unit 246 also generates a hard drive data enable signal HDBEN. The hard drive data enable signal HDBEN is used to enable a data buffer 425 that buffers data between the multiplexed address/data lines AD[31:0] of a PCI bus (i.e., PCI bus 220 of FIG. 2) and the data lines of the IDE hard drive 402. It is noted that since the IDE hard drive 402 is a 16-bit device, the data buffer 425 is a 16-bit buffer.

Figure 5:
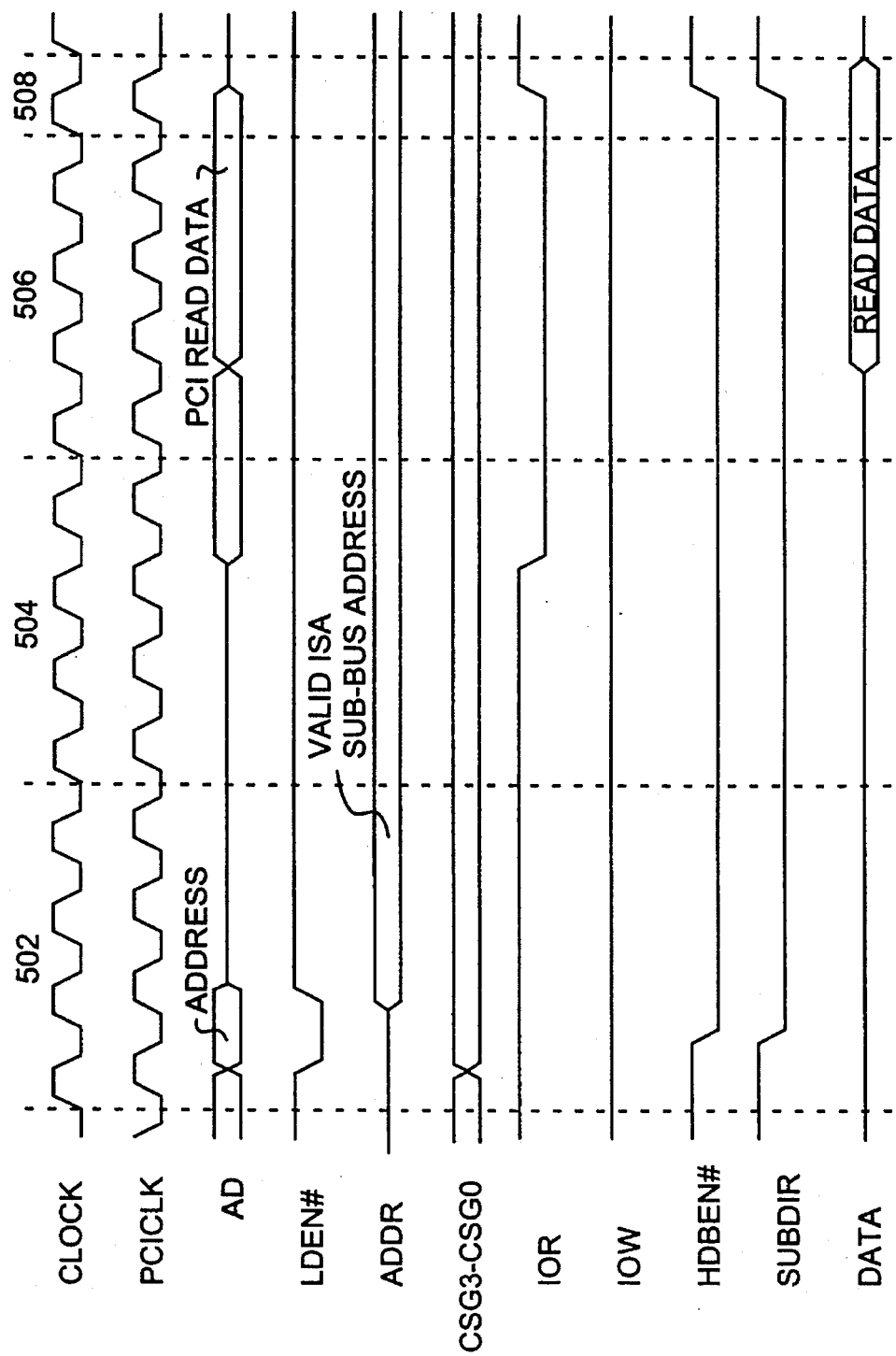
FIG. 5 is a timing diagram that illustrates the data, address, and control signals associated with a 16-bit read operation to the IDE hard drive of FIG. 4.

Referring next to FIG. 5 in conjunction with FIG. 4, the operation of the computer system of FIG. 4 is next explained. FIG. 5 is a timing diagram that illustrates the data, address, and control signals associated with an I/O read operation to IDE hard drive 402. When the CPU core initiates a read cycle to the I/O addressable space to which IDE hard drive 402 is mapped, a valid address signal is driven through the PCI bus interface unit (i.e., unit 244 of FIG. 2) on the multiplexed address/data lines AD[31:0] of PCI bus 220 during an ISA sub-bus state 502. At this time, the ISA sub-bus control unit 246 asserts the loading signal LDEN. The valid address signal is thereby latched into address latch 226 synchronously with the rising edge of the PCI clock signal. At the same time the valid address signal is driven on PCI bus 220, the chip select signals CSG0–CSG3 are driven with a predetermined encoded value that corresponds to the IDE hard drive 402. The decoder 420 decodes the encoded value and responsively asserts a signal at an output line 430 to select the IDE hard drive 402. As illustrated in FIG. 5, the chip select signals CSG0–CSG3 are driven during the entire I/O read cycle. Upon the rising edge of the loading signal LDEN, a valid address signal is provided at the output of address latch 226 and to an address port 434 of IDE hard drive 402. During state 502, the hard drive data enable signal HDBEN and the data direction signal SUBDIR are asserted low to allow the transfer of data from IDE hard drive 402 through data buffer 425 to the multiplexed address/data lines of PCI bus 220.

During ISA sub-bus state 504, the I/O read signal IOR is asserted low by ISA sub-bus control unit 246. The IDE hard drive 402 responsively fetches the addressed data from the requested location, and drives the data through data buffer 425 to the multiplexed address/data lines of PCI bus 220 during ISA sub-bus state 506. When the ISA sub-bus control unit 246 deasserts the I/O read signal IOR during state 508, PCI interface unit 244 (illustrated in FIG. 2) latches the data into the integrated processor 210. This completes the ISA sub-bus read operation to the IDE hard drive 402.

Read and write operations to keyboard controller 404, RTC 406, modem 408, serial port 410, parallel port 412, and floppy controller 414 are accomplished in a manner similar to that described above in conjunction with FIGS. 2 and 3. It is noted, however, that the chip select signals CSG0–CSG3 are driven with a different predetermined encoded value to select different ISA peripheral devices. It is further noted that a write operation to IDE hard drive 402 is also accomplished by driving the ISA side-band signals in accordance with standard ISA-style bus timing. For a write operation, the data direction signal SUBDIR is complemented (with respect to its state during a read cycle).

Figure 6:
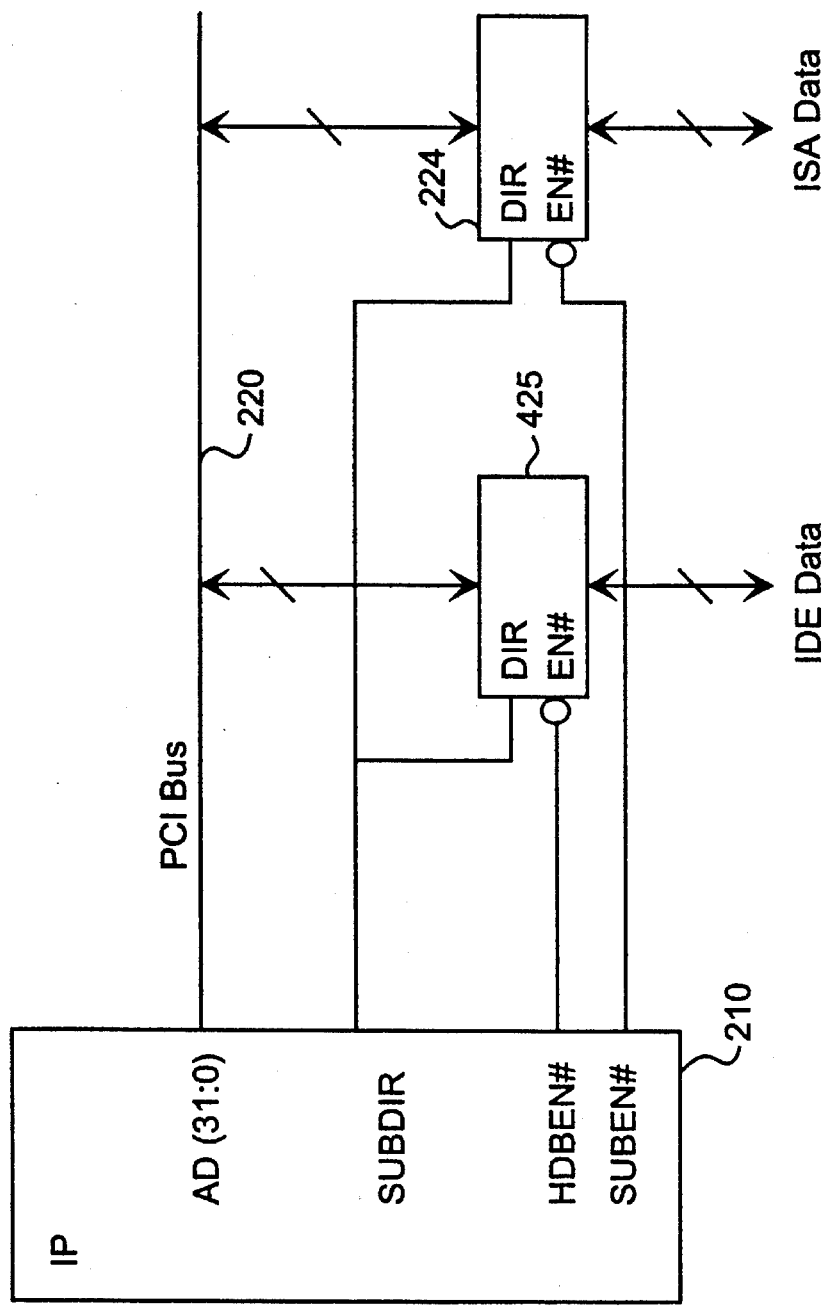
FIG. 6 is a block diagram that illustrates separate ISA sub bus and IDE data buffers.
Figure 7:
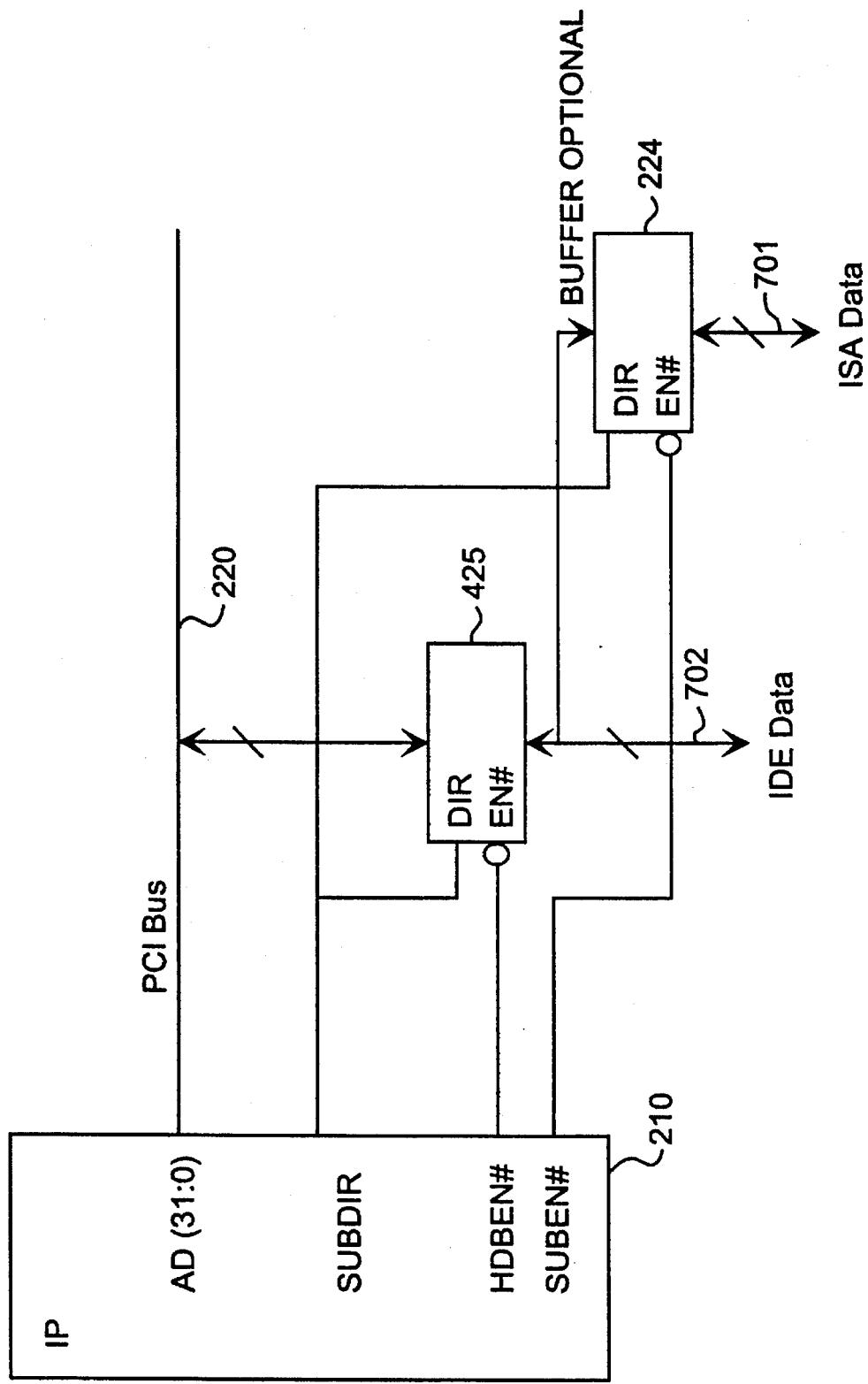
FIG. 7 is a block diagram that illustrates an ISA sub bus data buffer cascaded from an IDE data buffer.
Figure 8:
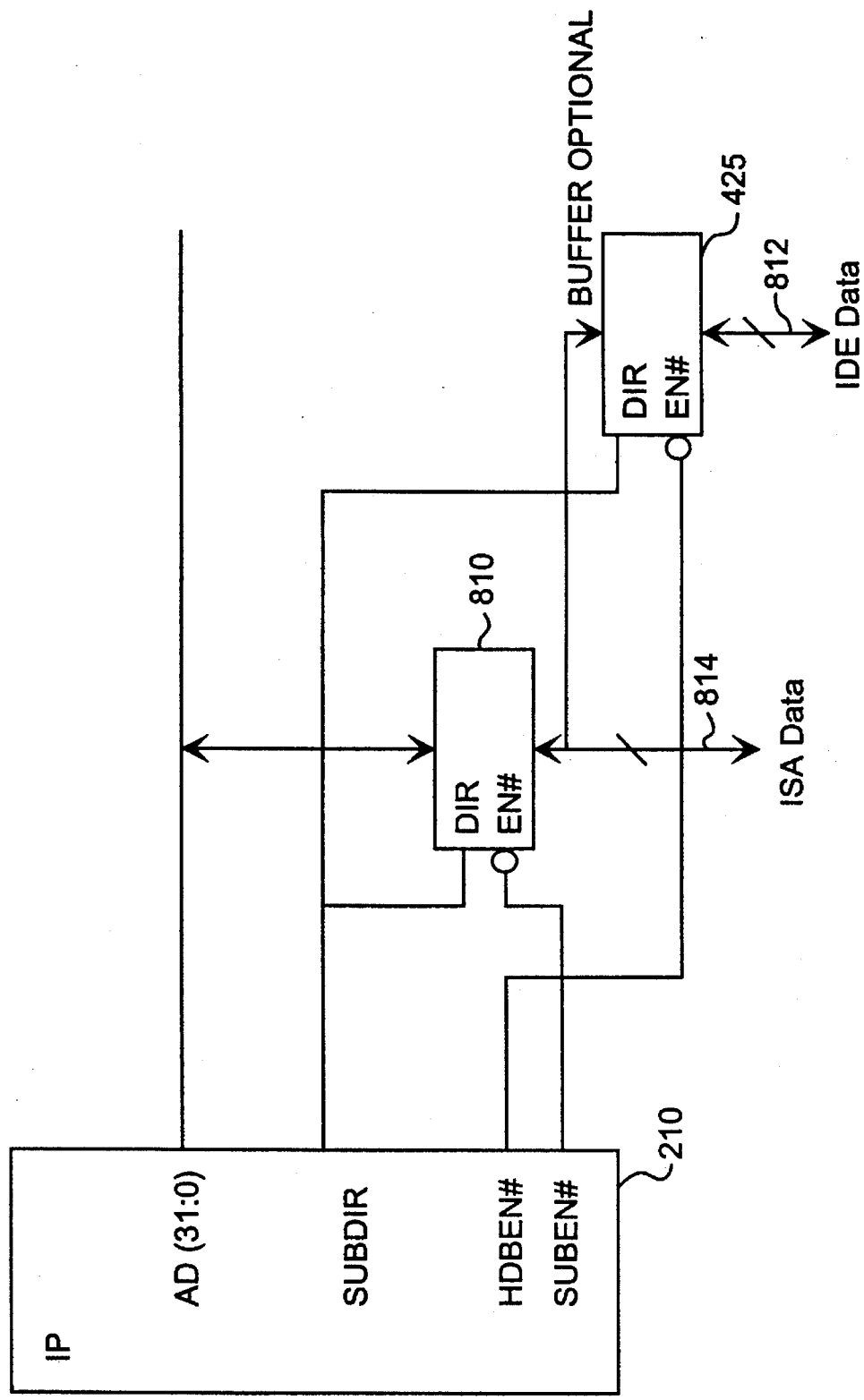
FIG. 8 is a block diagram that illustrates an IDE data buffer cascaded from an ISA data buffer.

FIGS. 6–8 illustrate several alternative configurations for coupling data between PCI bus 220 and an IDE hard drive, as well as between PCI bus 220 and a standard 8-bit ISA peripherals. FIG. 6 illustrates a configuration in which separate ISA sub-bus and IDE data buffers are employed. This configuration is identical to that shown in FIG. 4. FIG. 7 illustrates a configuration in which the 8-bit ISA sub-bus data is cascaded from the IDE data buffer 425. For this configuration, the 8-bit data buffer 224 is optional. Standard 8-bit ISA peripherals may be connected to data buffer 224 at lines 701, and an IDE hard drive may be connected at lines 702. Referring finally to FIG. 8, a configuration is shown in which the 16-bit IDE data is cascaded from a 16-bit ISA data buffer 810. The IDE data buffer 425 is optional for this configuration. An IDE hard drive may be connected at lines 812, and a standard ISA peripheral may be connected at lines 814.

It is noted that an integrated processor employing a sub-bus control unit as described above may also employ a variety of other pin-reducing circuits or techniques. For example, the integrated processor 210 may be configured to employ the power management message bus as described within the co-pending, commonly assigned patent application entitled "Power Management Message Bus For Integrated Processor"; by Gephardt, et al.; Ser. No. 08/190,280; filed concurrently herewith. This application is incorporated herein by reference in its entirety.

Numerous variations and modifications will become apparent to those skilled in the art once the above disclosure is fully appreciated. For example, although the high performance multiplexed address/data bus 220 of FIG. 2 is a PCI standard bus, other multiplexed high performance buses could be alternatively employed. Furthermore, it is noted that the integrated processor 210 of FIG. 2 may incorporate a variety of additional on-chip peripheral devices. It is intended that the following claims be interpreted to embrace all such variations and modifications.

What is claimed is:

1. A computer system comprising:

a peripheral bus including a plurality of multiplexed address/data lines;

a latch having an input port coupled to said plurality of multiplexed address/data lines;

a data buffer having a first port coupled to said plurality of multiplexed address/data lines;

an integrated processor fabricated on a single integrated circuit and including:
   a CPU core;
   a local bus coupled to said CPU core;
   a bus interface unit configured to interface data, address, and control signals between said local bus and said peripheral bus; and
   a sub-bus control unit for generating signals used to control a secondary, non-multiplexed bus external to said integrated processor, wherein said sub-bus control unit is coupled to said bus interface unit and to said latch and is configured to generate a loading signal indicative of the presence of a valid address on said peripheral bus, and wherein said loading signal is provided to said latch for selectively causing said valid address to be latched within said latch; and a peripheral device compatible with said secondary, non-multiplexed bus, and having a plurality of addressing lines coupled to an output port of said latch, and a plurality of data lines coupled to a second port of said data buffer.

2. The computer system as recited in claim 1 wherein said peripheral bus is a PCI standard configuration bus.

3. The computer system as recited in claim 2 wherein said peripheral device is an ISA standard peripheral device.

4. The computer system as recited in claim 1 wherein said data buffer includes a direction control input line, and wherein said sub-bus control unit is configured to generate a direction control signal that is provided to the direction control input line of said data buffer to control a flow of data through said data buffer.

5. The computer system as recited in claim 4 wherein said sub-bus control unit is further configured to generate an I/O write signal and an I/O read signal, wherein said direction control signal is dependent upon whether said sub-bus control unit asserts said I/O write signal or said I/O read signal.

6. The computer system as recited in claim 5 wherein said I/O read signal is asserted during a read cycle to said peripheral device, and wherein said I/O read signal makes a transition from an asserted state to a deasserted state when valid read data is present on said multiplexed address/data lines.

7. The computer system as recited in claim 4 wherein said sub-bus control unit is further configured to assert a data enable signal that is received by said data buffer to enable the flow of data through said data buffer.

8. The computer system as recited in claim 1 wherein said CPF core implements an 80486 instruction set.

9. The computer system as recited in claim 1 wherein said loading signal is asserted during an address phase of said peripheral bus and wherein said loading signal is deasserted prior to a data phase of said peripheral bus.

10. The computer system as recited in claim 1 wherein said loading signal is provided to an enable control line of said latch.

11. The computer system as recited in claim 10 wherein a peripheral bus clock signal is provided to a clock input line of said latch.

12. The computer system as recited in claim 1 wherein said sub-bus control unit is further configured to assert a select signal for selecting said peripheral device.

13. The computer system as recited in claim 1 further comprising a decoder coupled to said sub-bus control unit, wherein said sub-bus control unit generates an encoded chip select value, and wherein said decoder decodes said encoded chip select value and generates a corresponding chip select signal that is provided to said peripheral device.

14. A computer system comprising:

a PCI standard configuration peripheral bus including a plurality of multiplexed address/data lines;

a latch having an input port coupled to said plurality of multiplexed address/data lines;

a data buffer having a first port coupled to said plurality of multiplexed address/data lines;

an integrated processor fabricated on a single integrated circuit and including:

a CPU core;

a local bus coupled to said CPU core;

a bus interface unit configured to interface data, address, and control signals between said local bus and said PCI standard configuration peripheral bus; and a ISA sub-bus control unit for generating signals used to control an ISA bus external to said integrated processor, wherein said ISA sub-bus control unit is coupled to said bus interface unit and to said latch and configured to generate a loading signal indicative of the presence of a valid address on said peripheral bus; and a peripheral device being compatible with said ISA bus, and having a plurality of addressing lines coupled to an output port of said latch, and a plurality of data lines coupled to a second port of said data buffer.

15. The computer system as recited in claim 14 wherein said data buffer includes a direction control input line, and wherein said ISA sub-bus control unit is configured to generate a direction control signal that is provided to the direction control input line of said data buffer to control a flow of data through said data buffer.

16. The computer system as recited in claim 15 wherein said ISA sub-bus control unit is further configured to generate an I/O write signal and an I/O read signal, wherein said direction control signal is dependent upon whether said ISA sub-bus control unit asserts said I/O write signal or said I/O read signal.

17. The computer system as recited in claim 16 wherein said loading signal is asserted during an address phase of said peripheral bus and wherein said loading signal is deasserted prior to a data phase of said peripheral bus.

* * * * *